United States Patent
Shinozaki (10) Patent No.: US 7,490,779 B2
(45) Date of Patent: Feb. 17, 2009

(54) READING APPARATUS, INFORMATION PROCESSING SYSTEM AND ANTIFORGERY METHOD

(75) Inventor: Kengo Shinozaki, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/442,307

(22) Filed: May 30, 2006

(65) Prior Publication Data

US 2007/0084932 A1   Apr. 19, 2007

(30) Foreign Application Priority Data

Oct. 18, 2005   (JP)   ............... 2005-303284

(51) Int. Cl.
G06K 7/10   (2006.01)

(52) U.S. Cl. .................. 235/472.03; 235/454; 382/100; 359/2

(58) Field of Classification Search ............. 235/454, 235/468, 470, 472.01–472.03, 462.46–462.49; 359/2, 28; 382/314

See application file for complete search history.

(56) References Cited

U.S. PATENT DOCUMENTS

| | | | | |
|---|---|---|---|---|
| 4,870,268 A * | 9/1989 | Vincent et al. | ............... | 250/226 |
| 5,610,718 A * | 3/1997 | Sentoku et al. | ............. | 356/490 |
| 5,773,808 A * | 6/1998 | Laser | .................... | 235/462.42 |
| 5,852,434 A * | 12/1998 | Sekendur | .................... | 345/179 |
| 5,874,722 A * | 2/1999 | Rando et al. | ........... | 235/472.01 |
| 6,354,501 B1 * | 3/2002 | Outwater et al. | ....... | 235/462.01 |
| 6,373,965 B1 * | 4/2002 | Liang | .......................... | 382/112 |
| 6,432,518 B1 | 8/2002 | Torii et al. | | |
| 6,536,672 B1 * | 3/2003 | Outwater | .................... | 235/491 |
| 6,592,039 B1 | 7/2003 | Smith et al. | | |
| 6,603,864 B1 | 8/2003 | Matsunoshita | | |
| 6,677,273 B2 | 1/2004 | Torii et al. | | |
| 6,752,317 B2 * | 6/2004 | Dymetman et al. | ..... | 235/462.45 |
| 6,981,648 B1 * | 1/2006 | Inaba et al. | .................. | 235/488 |
| 7,079,230 B1 * | 7/2006 | McInerney et al. | ............ | 356/71 |

(Continued)

FOREIGN PATENT DOCUMENTS

CN   1636227 A   7/2005

(Continued)

OTHER PUBLICATIONS

U.S. Appl. No. 11/250,401, filed Oct. 17, 2005 in the name of Onishi et al.

(Continued)

Primary Examiner—Seung H Lee
Assistant Examiner—Christie I Marshall
(74) Attorney, Agent, or Firm—Oliff & Berridge, PLC (57) ABSTRACT

A reading apparatus includes an exposure system, a light receiving system, a decoding section and a determination section. The exposure system applies light to a code image printed on a medium. The light has an infrared wavelength and a visible wavelength. The light receiving system receives infrared light and visible light, which are the light reflected on the medium, to capture the code image with the infrared light and capture the code image with the visible light. The decoding section reads a code from the code image captured with the infrared light. The determination section determines authenticity of the medium based on at least the code image captured with the visible light.

20 Claims, 7 Drawing Sheets

U.S. PATENT DOCUMENTS

| | | |
|---|---|---|
| 2003/0175608 A1 | 9/2003 | Takagi et al. |
| 2004/0183004 A1* | 9/2004 | Niggemann et al. .......... 250/271 |
| 2005/0139681 A1* | 6/2005 | Premjeyanth et al. ....... 235/468 |
| 2005/0147912 A1 | 7/2005 | Takagi et al. |
| 2005/0180037 A1* | 8/2005 | Masterson et al. .......... 359/892 |

FOREIGN PATENT DOCUMENTS

| | | |
|---|---|---|
| EP | 0 719 654 A1 | 7/1996 |
| JP | A-2000-293303 | 10/2000 |
| JP | A-2003-186238 | 7/2003 |
| JP | A-2005-249968 | 9/2005 |

OTHER PUBLICATIONS

U.S. Appl. No. 11/372,197, filed Mar. 10, 2006 in the name of Onishi.

* cited by examiner

READING APPARATUS, INFORMATION PROCESSING SYSTEM AND ANTIFORGERY METHOD

This application claims priority under 35 U.S.C. 119 from Japanese patent application No. 2005-303284 filed on Oct. 18, 2005, the disclosure of which is incorporated by reference herein.

BACKGROUND

Technical Field

The invention relates to a reading apparatus for reading a code from a code image printed on a medium such as paper with a color material, such as ink or toner, for absorbing infrared light, an information processing system including this reading apparatus, and a antiforgery method.

SUMMARY

According to an aspect of the invention, a reading apparatus includes an exposure system, a light receiving system, a decoding section and a determination section. The exposure system applies light to a code image printed on a medium. The light has an infrared wavelength and a visible wavelength. The light receiving system receives infrared light and visible light, which are the light reflected on the medium, to capture the code image with the infrared light and capture the code image with the visible light. The decoding section reads a code from the code image captured with the infrared light. The determination section determines authenticity of the medium based on at least the code image captured with the visible light.

The code image may be printed on the medium with a color material that is invisible and absorbs infrared light.

The expression "invisible" regarding the color material refers to absorptance to such an extent that it is impossible or difficult to read the color material with a image sensor of a device, such as a copying machine, regardless of whether or not human can recognize the color material with eyes. For example, the expression "invisible" refers to the case where average absorptance of the color material in a visible region (400 nm to 700 nm) is 15% or less. In a similar manner to this, the expression "absorb infrared light" regarding the color material refers to machine-readable absorptance. For example, the expression "absorb infrared light" refers to the case where absorptance of the color material in a near-infrared region (800 nm to 1000 nm) is 20% or more.

According to another aspect of the invention, a reading apparatus includes a pen, an exposure system, a light receiving system, a decoding section, a calculation section and a determination section. The pen is capable of writing on a medium on which a plurality of code images are printed in a matrix manner with a color material, which is invisible and absorbs infrared light. The exposure system applies light to the plurality of code image printed on the medium. The light has an infrared wavelength and a visible wavelength. The light receiving system receives infrared light and visible light, which are the light reflected on the medium, to capture the code images with the infrared light and capture the code images with the visible light. The decoding section reads position codes indicating positions of the captured code image from the code image captured with the infrared light. The calculation section calculates a locus of the pen based on the position codes read by the decoding section. The determination section determines authenticity of the medium based on at least the code images captured with the visible light.

According to still another aspect of the invention, a information processing system includes the reading apparatus set forth above and a processing apparatus. The reading apparatus reads the code from the code image printed on the medium. The processing apparatus performs predetermined processing based on the code read by the reading apparatus.

According to further another aspect of the invention, an antiforgery method includes applying light, which includes a visible wavelength, to a code image printed on a medium with a color material that is invisible and absorbs infrared light to capture the code image; and reading a code from the captured code image.

BRIEF DESCRIPTION OF THE DRAWINGS

Exemplary embodiments of the invention will be described in detail based on the following figures, wherein.

DETAILED DESCRIPTION

FIRST EXEMPLARY EMBODIMENT (Whole Configuration of System)

Figure 1:
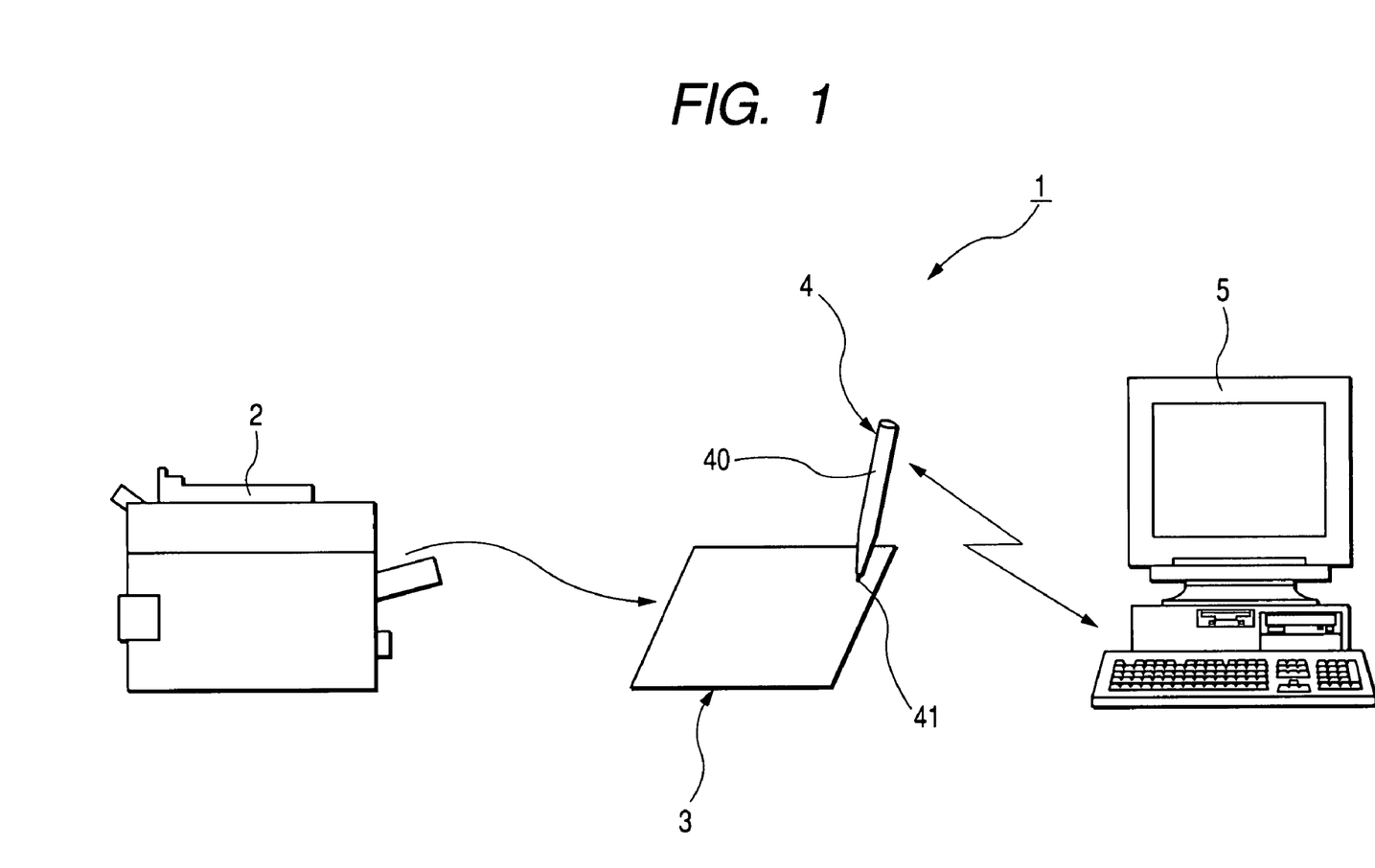
FIG. 1 is a schematic diagram of an information processing system according to a first exemplary embodiment of the invention.

FIG. 1 shows an information processing system according to a first exemplary embodiment of the invention. This information processing system 1 includes an image formation apparatus 2 for printing an invisible code image and a visible document image on a sheet of paper to form a medium 3; an information reading apparatus 4 for reading information from the code image on the medium 3 and sending the read information via radio waves; and an information processing apparatus 5 for processing the information sent from the information reading apparatus 4.

A communication method such as Bluetooth (registered trademark) or a wireless LAN (Local Area Network) can be used in communication between the information reading apparatus 4 and the information processing apparatus 5 via radio waves. It is note that communication between the information reading apparatus 4 and the information processing apparatus 5 is not limited to radio waves, but may be implemented by wireless method such as infrared rays or wire method such as a USB (Universal Serial Bus) cable.

(Image Formation Apparatus)

The image formation apparatus 2 is one for printing with toner by, for example, an electrophotographic method. As toner, particular toner may be used as well as toners of Y (yellow), M (magenta), C (cyan) and K (black). Toner (hereinafter also called "invisible toner"), which is invisible and absorbs infrared light, is used as the particular toner. Black can be provided by superimposing Y, M and C. Therefore, the toner of K may not be used.

The invisible toner is required that, for example, average absorptance in a visible region (400 nm to 700 nm) be 15% or less and preferably 10% or less. Also, the invisible toner is required that absorptance in a near-infrared region (800 nm to 1000 nm) be 20% or more and preferably 30% or more.

If the average absorptance of the invisible toner in the visible region (400 nm to 700 nm) exceeds 15%, human can recognize the toner with eyes due to decrease in invisibility, and forgery by using a general-purpose copying machine can be performed. Also, if the absorptance of the invisible toner in the near-infrared region (800 nm to 1000 nm) is less than 20%, machine reading of the invisible toner and decoding cannot be performed with good accuracy.

As the invisible toner, for example, toner (disclosed in US 2003/0175608 A and US 2005/0147912 A, entire contents of which are incorporated herein by reference) including (i) binding resin containing polyester and/or polystyrene as a main component and (ii) inorganic near-infrared light absorption material containing CuO and $P_2O_5$; and toner (disclosed in JP 2005-249968 A) including (i) binding resin polyester and/or polystyrene as a main component and (ii) organic near-infrared light absorption material such as immonium salt and aluminum salt can be used.

Incidentally, various methods such as an ink-jet method or a thermosensitive transfer method can be used in addition to the electrophotographic method. For example, in the case of using the ink-jet method or the thermosensitive transfer method, ink, which is invisible and absorbs infrared light, is used as a particular color material.

The medium 3 may be one made of paper, plastic or cloth, or a white board.

(Information Reading Apparatus)

The information reading apparatus 4 includes a casing 40 having the outer shape substantially similar to that of a common pen and a wiring pen part 41 disposed at the end of the casing 40. The information reading apparatus 4 has a function of capturing a code image on the medium 3, a function of reading a code from the code image and a function of acquiring written data prepared by the a wiring pen part 41. These functions will be described below.

The wiring pen part 41 has a pen tip at its tip end, a writing pressure detection section (described below) for detecting a writing pressure on the pen tip and an ink tank in its back.

(Information Processing Apparatus)

The information processing apparatus 5 includes a CPU for controlling the whole of this apparatus 5, a storage section constructed by ROM, RAM, a hard disk, etc. for storing various data or application programs of the CPU, an input device such as a keyboard, a mouse, etc., a communication section for sending and receiving information to/from the information reading apparatus 4 via radio waves, a network interface connected to a network, a display section such as an LCD (Liquid Crystal Display) etc. for displaying a screen, and a sound output section having a speaker for outputting sound. Such an information processing apparatus 5 can be implemented by, for example, a personal computer (PC).

(Image on Medium)

Figure 2A:
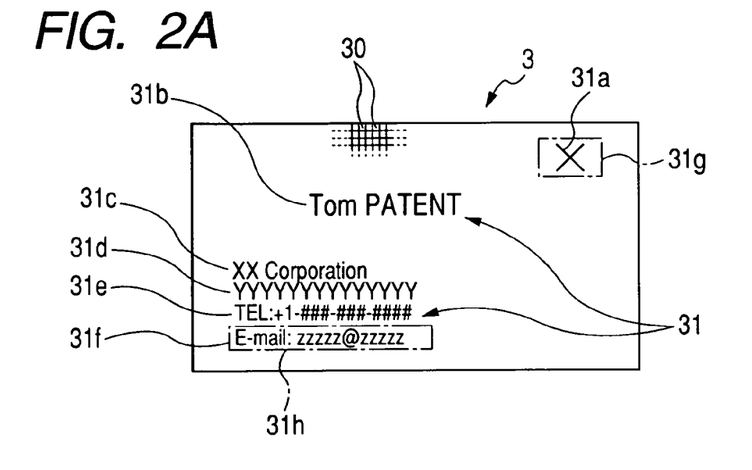
FIG. 2A is a plan diagram of a medium.
Figure 2B:
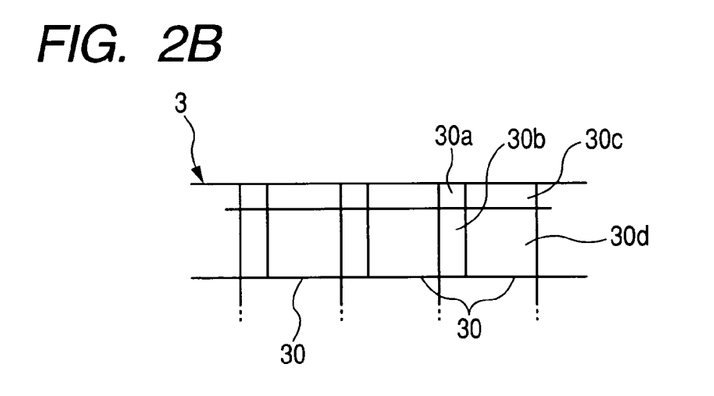
FIG. 2B is a diagram showing the whole configuration of a code image.
Figure 2C:
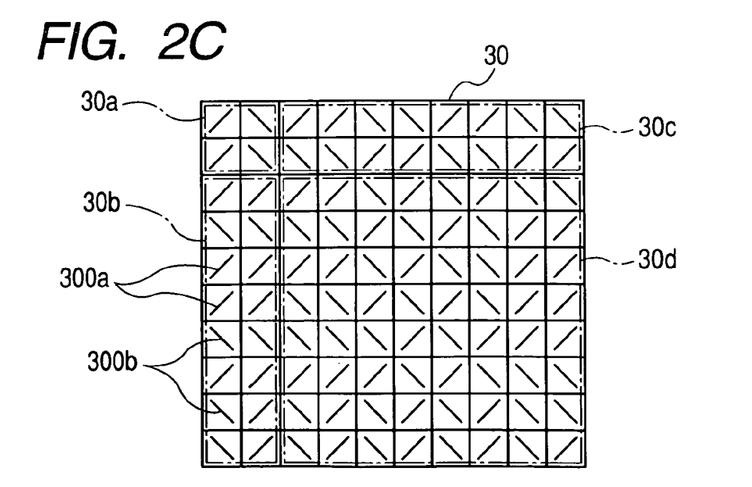
FIG. 2C is a diagram showing a detailed configuration of the code image.

FIGS. 2A to 2C show details of the medium 3. In this exemplary embodiment, description will be given on the case of applying the medium 3 to a business card. As shown in FIGS. 2A and 2B, for example, many invisible code images 30 having 2 mm by 2 mm in size and a large infrared light absorption coefficient are printed in a matrix manner on the whole sheet of paper of the medium 3 of this business card. Also, a document image 31 including characters, symbols and graphics is printed in predetermined positions of the sheet of paper of the business card.

As the document image 31, for example, a logo 31a is printed with red and a name 31b, a corporation name 31c, an address 31d, a telephone number 31e and an E-mail address 31f are printed with black. The logo 31a is printed within a logo area 31g. The E-mail address 31f is printed within an E-mail address area 31h. The information processing apparatus 5 is configured to activate a predetermined program when the logo area 31g and the E-mail address area 31h are specified by the information reading apparatus 4.

The code image 30 has a rotation code part 30a arranged in the upper left portion, an X coordinate code part 30b arranged below the rotation code part 30a, a Y coordinate code part 30c arranged to the right of the rotation code part 30a and an identification code part 30d arranged in the lower right portion of the rotation code part 30a.

Information indicating a region of the code image 30 itself is encoded in the rotation code part 30a. An X coordinate and a Y coordinate on the medium 3 of the code image 30 itself are respectively encoded in the X coordinate code part 30b and the Y coordinate code part 30c. Identification information about the medium 3 and/or identification information about the document image 31 printed on the medium 3 are encoded in the identification code part 30d. The same X coordinate is encoded longitudinally in the X coordinate code part 30b and the same Y coordinate is encoded transversely in the Y coordinate code part 30c. The same codes are recorded in all the rotation code part 30a and the identification code part 30d regardless of a position of the code image 30.

The identification information about the medium 3 may include, for example, information about a sheet of paper (size, paper quality, etc.) and kinds of a document (a business card, a medical chart, a check, etc.). The identification information about the document image 31 may include a document ID, a personal ID, a file name, a URL, etc.

As shown in FIG. 2C, each of the code parts 30a to 30d is constructed of combinations of slash patterns 300a each having a slash "/" and slash patterns 300b each having a backslash "\". The slash patterns 300a, 300b are formed, for example, at 0.2-mm pitch. Also, each slash pattern 300a, 300b represents 1 bit information (0 or 1). For example, a code pattern including slashes "/" and backslashes "\" is detailed in U.S. patent application Ser. No. 11/250,401 and U.S. Patent Application filed on Mar. 10, 2006 with claim for foreign priority of Japanese Patent Application No. 2005-171885, which are incorporated by reference in its entirety.

A pattern in the code image 30 is not limited to the slash patterns 300a, 300b and may be a two-dimensional code such as PDF417, Data Matrix, Maxi Code, a well-known QR code, or may be an original code or a one-dimensional code such as a bar code. Also, plural kinds of codes may be used in combination according to any purpose.

(Internal Structure of Information Reading Apparatus)

Figure 3:
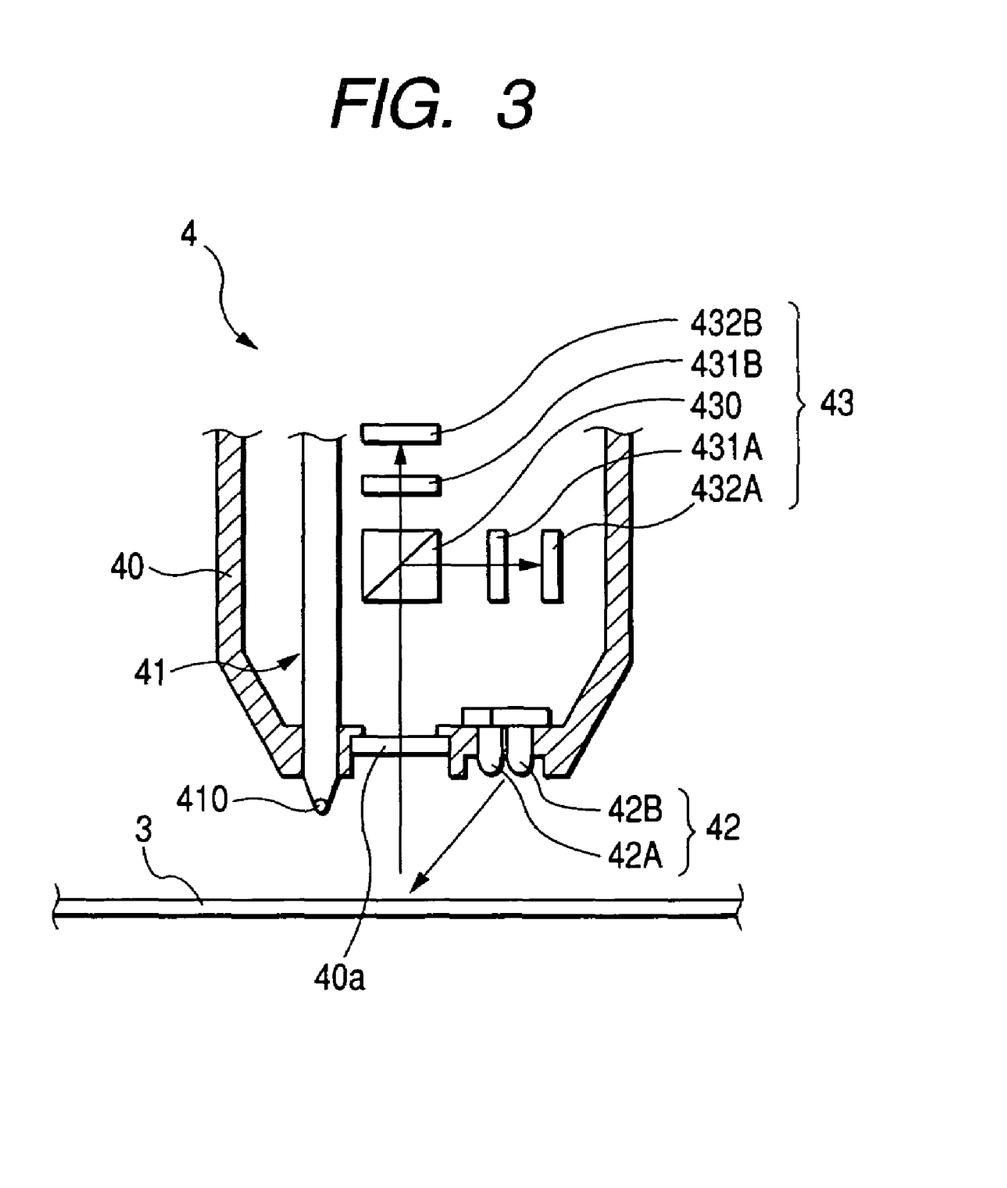
FIG. 3 is a sectional diagram showing an internal structure of an information reading apparatus according to the first exemplary embodiment of the invention.

FIG. 3 is a sectional diagram showing an internal structure of the information reading apparatus 4. This information reading apparatus 4 includes the casing 40 of a pen type, the writing pen part 41, an exposure system 42 and a light receiving system 43. The wiring pen part 41 is arranged so that the pen tip 410 is exposed from the end of the casing 40. The exposure system 42 applies to the medium 3 light having a visible wavelength and an infrared wavelength. The light receiving system 43 captures the images 30, 31 on the medium 3. These wiring pen part 41, exposure system 42 and light receiving system 43 are held in the casing 40.

The exposure system 42 includes an infrared LED (Light Emitting Diode) lamp 42A for applying to the medium 3 near-infrared light having a wavelength of 800 nm to 1000 nm; and a white LED lamp 42B for applying to the medium 3 white light having a wavelength of a visible region (400 nm to 700 nm).

As the white LED lamp 42B, for example, a combination of a blue LED chip and a fluorescent material for converting blue light into yellow light or a combination of a blue LED chip with a yellow LED chip may be used.

A single light source such as a halogen lamp for generating visible light and infrared light may be used instead of the infrared LED lamp 42A and the white LED lamp 42B.

The light receiving system 43 includes a beam splitter 430, a visible-light removal filter 431A, an infrared-light removal filter 431B, a CCD (Charge Couple Device) 432A for infrared light and a CCD 432B for visible light. The beam splitter 430 functions as an optical device for splitting reflected light from the medium 3 at a predetermined ratio. The visible-light removal filter 431A removes visible light from the light reflected by the beam splitter 430. The infrared-light removal filter 431B removes infrared light from the light passing through the beam splitter 430. The CCD 432A for infrared light functions as an imaging device for infrared light, which images infrared light passing through the visible-light removal filter 431A. The CCD 432B for visible light functions as an imaging device for visible light, which images visible light passing through the infrared-light removal filter 431B.

Incidentally, the beam splitter 430 and the filters 431A, 431B function as a separation section. Also, a half mirror may be used instead of the beam splitter 430.

The CCD 432A for infrared light and the CCD 432B for visible light are ones for photoelectric converting the received light into an electrical signal in accordance with an intensity of the received light. CCDs having sensitivity from a visible region to a near-infrared region may be used in common. Also, one having sensitivity in the near-infrared region may be used as the CCD 432A for infrared light. Also, one having sensitivity in the visible region may be used as the CCD 432B for visible light. As the imaging device, a CMOS (Complementary Metal Oxide Semiconductor) may be used instead of the CCDs 432A, 432B.

(Control System of Information Reading Apparatus)

Figure 4:
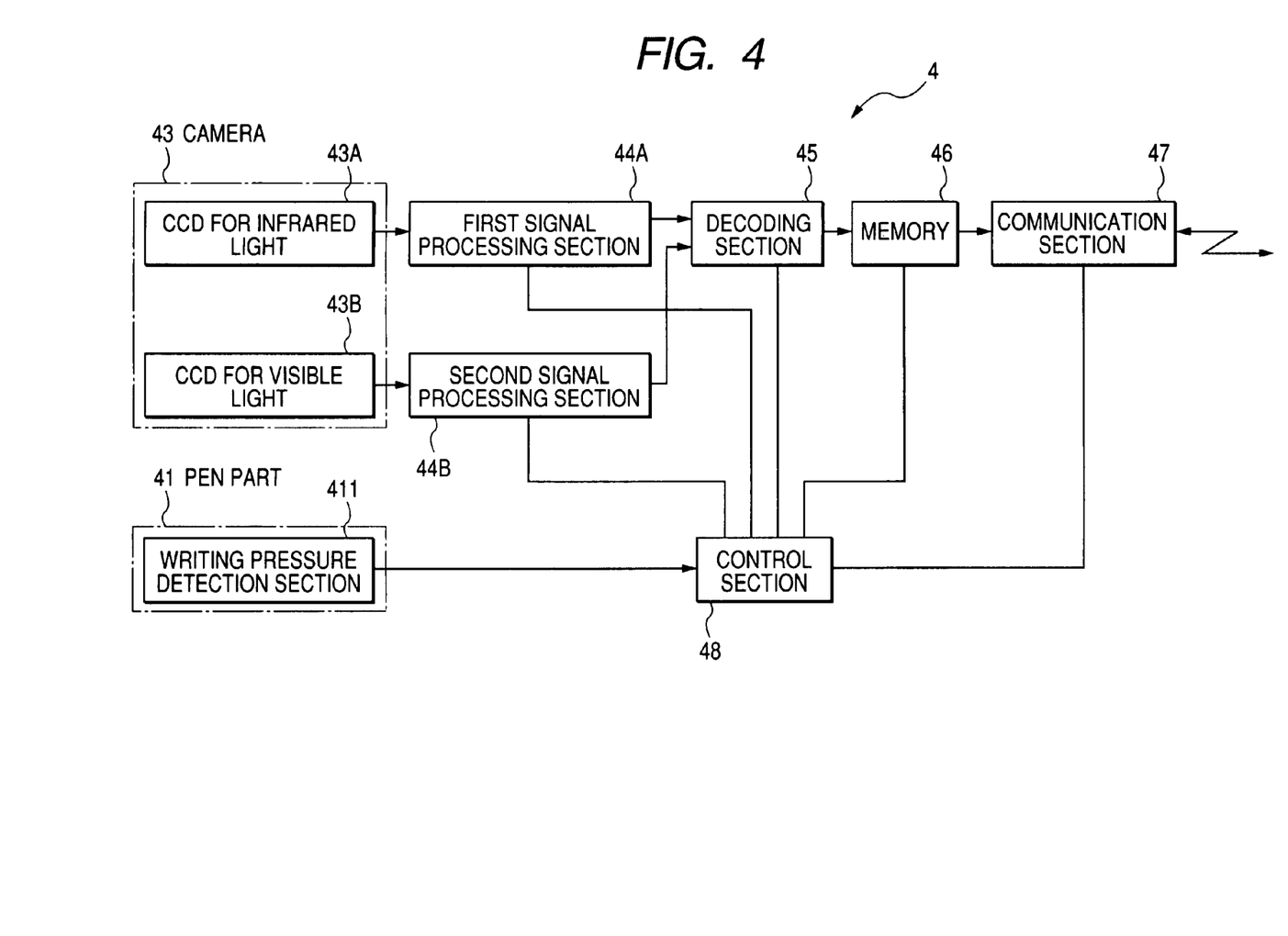
FIG. 4 is a block diagram showing a control system of the information reading apparatus according to the first exemplary embodiment of the invention.

FIG. 4 is a block diagram showing a control system of the information reading apparatus 4. This information reading apparatus 4 includes first and second signal processing sections 44A, 44B, a decoding section 45, a memory 46, a communication section 47, a control section 48 and a battery (not shown) as well as the LED lamps 42A, 42B, the CCDs 432A, 432B and the writing pressure detection section 411 as described above. The first and second signal processing sections 44A, 44B processes signals input from the CCDs 432A, 432B, respectively. The decoding section 45 decodes signals processed by the signal processing sections 44A, 44B. The memory 46 stores a code decoded by the decoding section 45. The communication section 47 communicates with the information processing apparatus 5 via radio waves. The control section 48 functions as a determination section, which controls each section of the information reading apparatus 4. The battery supplies a power source to each section of the information reading apparatus 4.

The writing pressure detection section 411, the signal processing sections 44A, 44B, the decoding section 45, the memory 46, the communication section 47 and the control section 48 are held in the casing 40.

The decoding section 45 reads a rotation code from the rotation code part 30a of the code image 30, an X coordinate code from the X coordinate code part 30b, a Y coordinate code from the Y coordinate code part 30c and an identification code from the identification code part 30d. This will be described below with reference to the drawing.

Figure 5A:
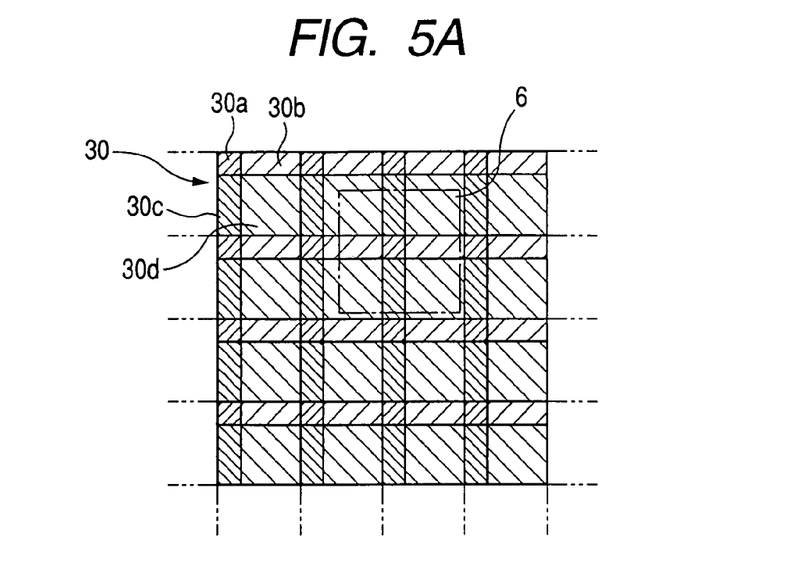
FIGS. 5A and 5B are diagrams explaining a way in which a decoding section according to the first exemplary embodiment of the invention reads respective codes.
Figure 5B:
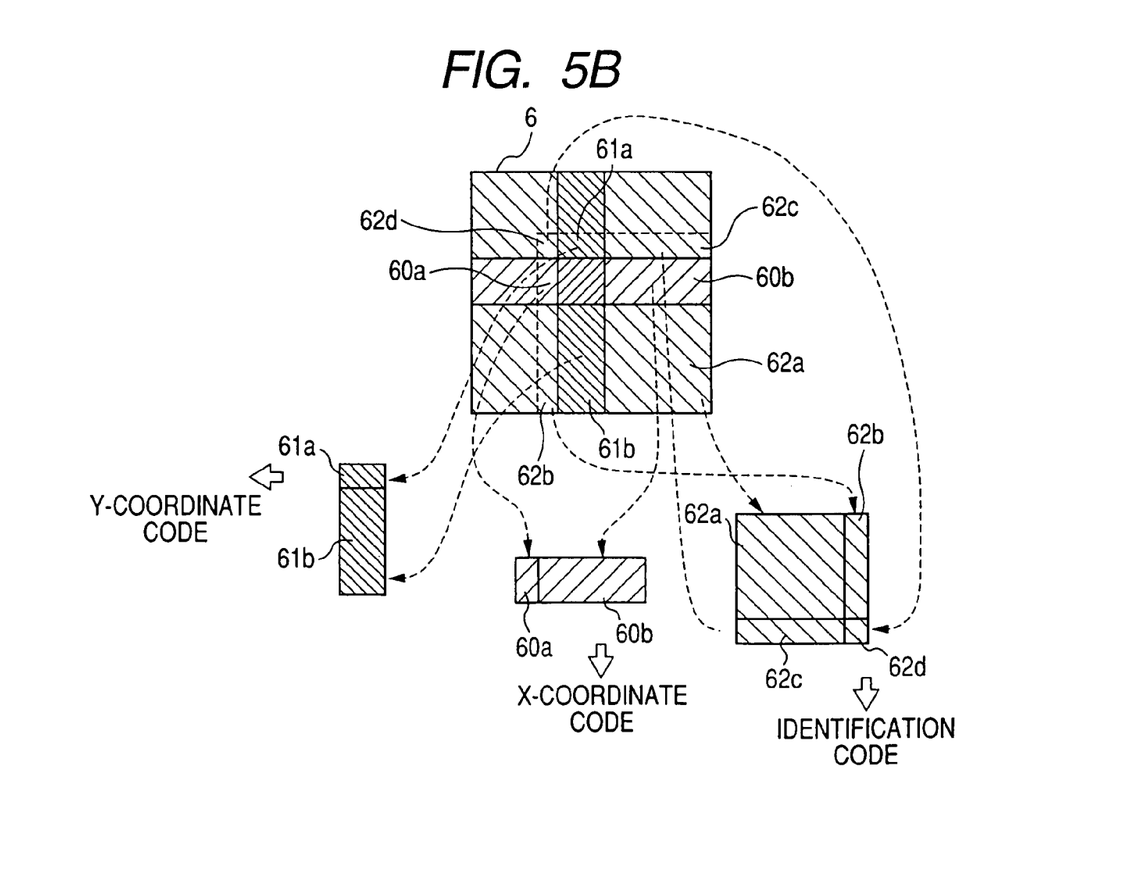

FIG. 5 is a diagram explaining a way in which the decoding section 45 reads respective codes. As shown in FIG. 5A, the code images 30 each including the rotation code part 30a, the X coordinate code part 30b, the Y coordinate code part 30c and the identification code part 30d are two-dimensionally arranged on the medium 3. In FIG. 5A, a region surrounded by a chain line indicates an image 6 captured by the CCDs 43A, 43B, that is, a read region. FIG. 5B shows details of the captured image 6.

The image 6 captured by the CCDs 43A, 43B is larger than the code image 30, and is, for example, 3 mm by 3 mm in size when the code image 30 is 2 mm by 2 mm in size as described above. The decoding section 45 combines each of image parts 60a, 60b, 61a, 61b, 62a, 62b, 62c, 62d of the captured image 6 and restores the X coordinate code, the Y coordinate code and the identification code as shown in FIG. 5B. Although The actual captured image 6 is often inclined with respect to the code image 30, each code can be restored by combining the image parts in a similar manner to the case shown in FIGS. 5A and 5B.

The first and second signal processing sections 44A, 44B convert analog electrical signals input from the CCDs 432A, 432B into digital signals, and also perform various processing such as inclination correction, gamma correction and/or noise removal.

The control section 48 is configured so that when the writing pressure detection section 411 detects a predetermined writing pressure or more, the control section 48 calculates a locus of the pen tip 410 based on an X coordinate code and a Y coordinate code, which indicate coordinates of the pen tip 410 and are decoded by the decoding section 45, and transmits the locus of the pen tip 410 to the information processing apparatus 5 through the communication section 47 as written data.

Also, the control section 48 is configured so that the control section 48 sends a warning signal indicating that the medium 3 is counterfeit to the information processing apparatus 5 through the communication section 47 when an output signal of the CCD 432B for visible light is input to the decoding section 45 at predetermined timing and can be decoded.

(Operation of Information Processing System)

Next, operation of the information processing system 1 will be described.

(1) Authenticity Determination of Medium

When the tip end of the information reading apparatus 4 is brought close to the medium 3 prepared by the image formation apparatus 2 and a switch (not shown) of the information reading apparatus 4 is turned on, the infrared LED lamp 42A emits infrared light and the white LED lamp 42B emits white light. The infrared light and the white light are reflected by the medium 3 and its reflected light passes through a transparent plate 40a and enters the light receiving system 43.

When the reflected light enters the light receiving system 43, the beam splitter 430 reflects and transmits the reflected light at a predetermined ratio. The light reflected by the beam splitter 430 enters the CCD 432A for infrared light after the visible-light removal filter 431A removes visible light therefrom. The CCD 432A for infrared light converts the incident infrared light into an electrical signal.

On the other hand, the light passing through the beam splitter 430 enters the CCD 432B for visible light after the infrared-light removal filter 431B removes infrared light therefrom. The CCD 432B for visible light converts the incident visible light into an electrical signal.

The first and second signal processing sections 44A, 44B convert analog electrical signals input from the CCDs 432A, 432B into digital signals and also perform various processing such as inclination correction, gamma correction and/or noise removal.

In this manner, the CCD 432A for infrared light and the CCD 432B for visible light capture images 60 to 100 times per second, respectively, and the first and second signal processing sections 44A, 44B perform the signal processing.

The control section 48 performs control so that an output signal of the CCD 432B for visible light is input to the decoding section 45 the first time and one time per plural times (for example, ten times) and an output signal of the CCD 432A for infrared light is input to the decoding section 45 otherwise. Input timing of the output signals of the CCDs 432A, 432B to the decoding section 45 is not limited to the timing described above.

When the output signal of the CCD 432B for visible light is input to the decoding section 45 and the decoding section 45 can decode it, the control section 48 sends a warning signal indicating that the medium 3 is counterfeit to the information processing apparatus 5 through the communication section 47, and terminates the decoding process or the like. Upon receiving the warning signal, the information processing apparatus 5 outputs alarm sound from the sound output section. A message indicating that the medium 3 is counterfeit may be displayed on a display section of the information processing apparatus 5 together with the alarm sound or in place of the audible alarm.

Figure 6:
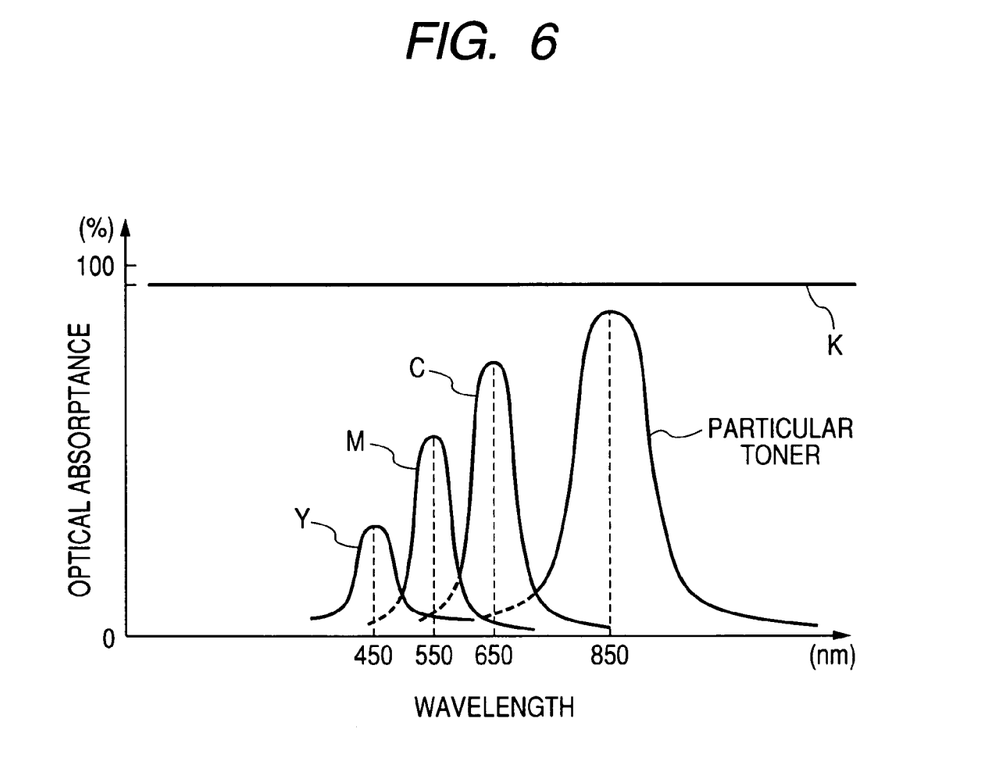
FIG. 6 is a diagram showing optical absorptance of each toner.

FIG. 6 shows optical absorptance of each toner in the case of applying white light (sunlight) including infrared light to each toner. It is assumed that toner having the maximum absorptance in 850 nm is used as invisible toner and that a lamp for emitting near-infrared light of 850 nm is used as the infrared LED lamp 42A. When the medium 3 is a counterfeit copied by a copying machine capable of reading infrared information, the code image 30 is printed with toner of K (black) and has optical absorptance of 90% or more with respect to the applied white light as shown in FIG. 6. As a result, when white light is applied from the white LED lamp 42B to the counterfeited code image 30, most of the white light is absorbed in the code image 30. Thus, the decoding section 45 can decode the counterfeited code image 30. On the other hand, in the case of the medium 3 is regular one, even if visible light (400 to 700 nm) is applied to the code image 30, most of the visible light is not absorbed. Therefore, the decoding section 45 cannot decode the code image 30. Accordingly, it can be determined that the medium is counterfeit when the code image can be decoded by applying white light to the medium, and it can be determined that the medium is regular one when the code image can be decoded by applying infrared light to the medium.

(2) Acquisition of Written Data

When the writing pressure detection section 411 detects a predetermined writing pressure or more, the control section 48 calculates the locus of the pen tip 410 based on the X coordinate code and the Y coordinate code, which indicate the coordinates of the pen tip 410 and are acquired by the decoding section 45, and stores the locus into the memory 46 as written data. Thereafter, the control section 48 sends the written data stored in the memory 46 to the information processing apparatus 5 through the communication section 47. The information processing apparatus 5 accumulates the written data sent from the information reading apparatus 4 in the storage section.

(3) Activation of Various Applications

When the tip end of the information reading apparatus 4 is brought close to the logo area 31g and a button (not shown) of the information reading apparatus 4 is operated to specify the logo area 31g, the decoding section 45 decodes position information including an X coordinate code and a Y coordinate code of the logo area 31g and the decoded position information is sent to the information processing apparatus 5 through the communication section 47. The information processing apparatus 5 accesses home page of corporation associated with the position information of the logo area 31g through the Internet, and displays the home page of the corporation on a display section of the information processing apparatus 5.

Also, in a similar manner similar, when the E-mail address area 31h is specified by the information reading apparatus 4, position information including an X coordinate code and a Y coordinate code of its E-mail address area 31h is sent to the information processing apparatus 5 and an electronic mail application associated with the position information of the E-mail address area 31h is activated in the information processing apparatus 5.

SECOND EXEMPLARY EMBODIMENT

Figure 7:
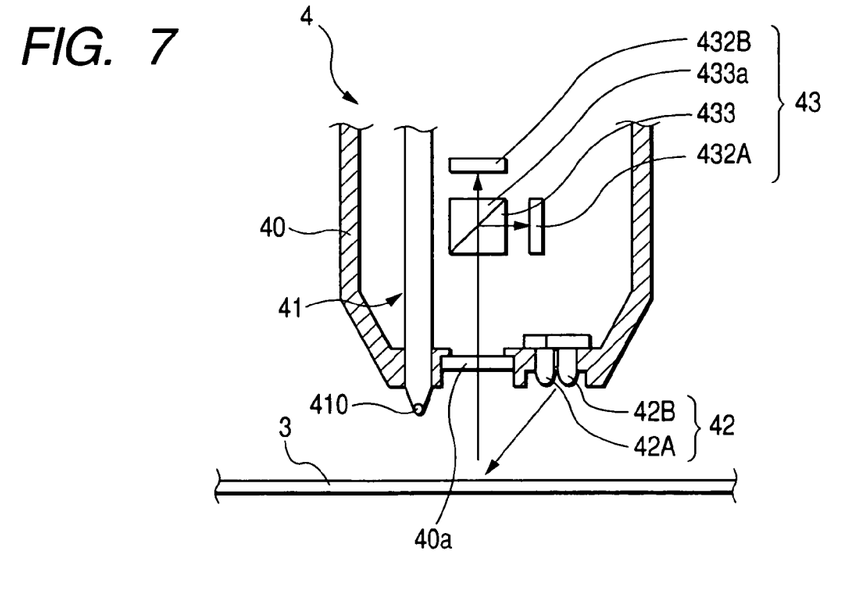
FIG. 7 is a sectional diagram showing an internal structure of an information reading apparatus according to a second exemplary embodiment of the invention.

FIG. 7 is a sectional diagram showing an internal structure of an information reading apparatus according to a second exemplary embodiment of the invention. An information reading apparatus 4 of the second exemplary embodiment is different from that of the first exemplary embodiment in a light receiving system 43 and the other parts are configured in a similar manner to the first exemplary embodiment.

The light receiving system 43 of the second exemplary embodiment includes a dichroic prism 433, a CCD 432A for infrared light and a CCD 432B for visible light. The dichroic prism 433 functions as a separation section, which transmits visible light and reflects infrared light among reflected light from a medium 3. The CCD 432A for infrared light images infrared light reflected by the dichroic prism 433. The CCD 432B for visible light images visible light passing through the dichroic prism 433.

The dichroic prism 433 is one in which inclined surfaces of two prisms having rectangular equilateral triangles in section are mutually joined through a dielectric multilayer film 433a for reflecting infrared light and transmitting visible light. The dichroic prism 433 may be another one, which transmits infrared light and reflects visible light. Also, a dichroic mirror coated with a dielectric multilayer film may be used instead of the dichroic prism 433.

THIRD EXEMPLARY EMBODIMENT

Figure 8:
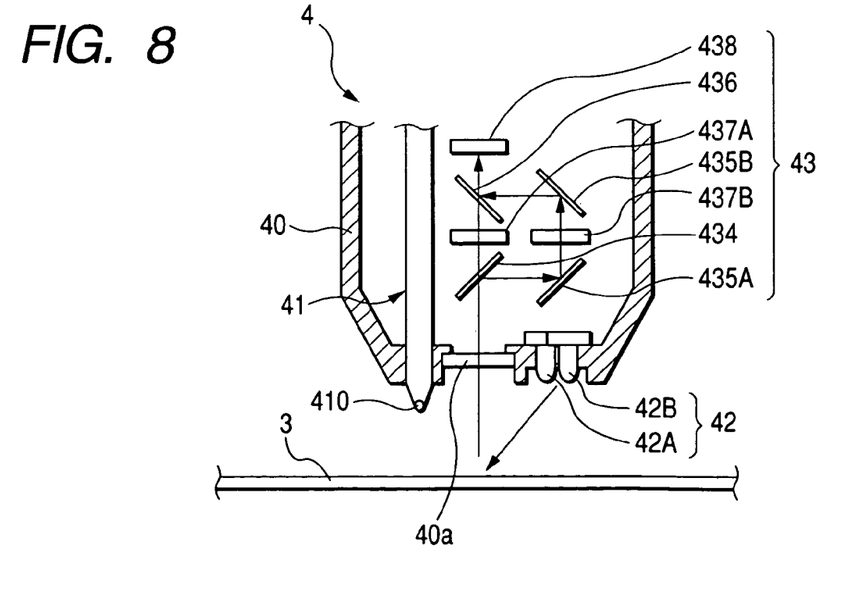
FIG. 8 is a sectional diagram showing an internal structure of an information reading apparatus according to a third exemplary embodiment of the invention.

FIG. 8 is a sectional diagram showing an internal structure of an information reading apparatus according to a third exemplary embodiment of the invention. An information reading apparatus 4 of this exemplary embodiment is different from that of the first exemplary embodiment in a light receiving system 43 and the other parts are configured in a similar manner to the first exemplary embodiment.

The light receiving system 43 of this exemplary embodiment includes a dichroic mirror 434, direction-change mirrors 435A, 435B, a half mirror 436, liquid crystal shutters 437A, 437B and a CCD 438. The dichroic mirror 434 reflects infrared light and transmits visible light. The direction-change mirrors 435A, 435B changes a propagation direction of infrared light reflected by the dichroic mirror 434. The half mirror 436 reflects a part of the infrared light whose propagation direction is changed by the direction-change mirror 435B and transmits a part of the visible light passing through the dichroic mirror 434. The liquid crystal shutters 437A, 437B are respectively arranged between the dichroic mirror 434 and the half mirror 436 and between the direction-change mirrors 435A, 435B. The CCD 438 receives the infrared light reflected by the half mirror 436 and the visible light passing through the half mirror 436. The dichroic mirror 434, the direction-change mirrors 435A, 435B, the half mirror 436 and the liquid crystal shutters 437A, 437B function as a separation section.

A control section 48 drives the liquid crystal shutters 437A, 437B so that the liquid crystal shutter 437A is closed and the liquid crystal shutter 437B is opened when a code image is captured with infrared light, and drives the liquid crystal shutters 437A, 437B so that the liquid crystal shutter 437A is opened and the liquid crystal shutter 437B is closed when a code image is captured with visible light. As a result, any of the infrared light and the visible light enters the CCD 438. Therefore, even the single CCD 438 can capture the code image with infrared light and the code image with visible light.

OTHER EMBODIMENTS

The invention is not limited to the embodiments described above, and various modifications can be made without departing from the gist of the invention. Also, the components of each embodiment described above can be combined arbitrarily without departing from the gist of the invention.

For example, in the embodiments, the case of applying the information reading apparatus 4 to the pen has been described, but the information reading apparatus 4 may be applied to a personal digital assistant (PDA) or a mobile telephone, etc. In this case, it is unnecessary for the personal digital assistant or the mobile telephone to have a writing function.

Also, the example has been described in which the code image has the rotation code part, the coordinate code part and the identification code part. However, in the simple case where it is unnecessary to acquire position information, only a code image for identification necessary to check authenticity may be printed with a color material, which is invisible and absorbs infrared light, on a medium. In this case, authenticity is determined based on images of the identification code captured with infrared light and visible light. For example, control of inhibiting a copy of documents can be performed based on this result.

Also, in the embodiments, the information processing apparatus 5 has been implemented by the PC, but may be implemented by a personal digital assistant (PDA) or a mobile telephone, etc.

Also, in the embodiments, display of the message or generation of the alarm sound indicating that the medium is counterfeit has been performed by the information processing apparatus 5, but may be performed by the information reading apparatus 4.

What is claimed is:

1. A reading apparatus comprising:
   an exposure system that applies light to a code printed on a medium, the light having an infrared wavelength and a visible wavelength;
   a light receiving system that receives infrared light and visible light, which are the light reflected on the medium, to capture the code image with the infrared light and capture the code image with the visible light;
   a decoding section that reads a code from the code image captured with the infrared light and reads a code from the code image captured with the visible light; and
   a determination section, wherein when an authentic medium of the medium has a code image printed with an invisible and infrared-light absorbing material and a visible image is overlapped with the code image, if the decoding section can read the code by decoding the overlapped visible image captured with the visible light, then the determination section recognizes that the decoding section was able to read and decode the overlapped visible image captured with visible light and determines that the medium is counterfeit.

2. The apparatus according to claim 1, wherein the code image is printed on the medium with a color material that is invisible and absorbs infrared light.

3. The reading apparatus according to claim 1, wherein the determination section determines authenticity of the medium based on the code image captured with the visible light and the code image captured with the infrared light.

4. The apparatus according to claim 1, wherein upon determining that the medium is counterfeit, the determination section outputs a warning signal indicating that the medium is counterfeit.

5. The apparatus according to claim 1, wherein:
   the light receiving system comprises:
   a separation section that separates the infrared light and the visible light from the light reflected on the medium; and
   a capturing section that receives the infrared light separated by the separation section to capture the code image with the infrared light, the capturing section that receives the visible light separated by the separation section to capture the code image with the visible light.

6. The apparatus according to claim 5, wherein:
   the separation section comprises:
   an optical device that splits the light reflected on the medium in two directions;
   an infrared-light removal filter disposed in one of the two directions with respect to the optical device, the infrared-light removal filter that removes infrared light from the light from the optical device; and
   a visible-light removal filter disposed in the other of the two directions with respect to the optical device, the visible-light removal filter that removes visible light from the light from the optical device, the capturing section comprises
a first imaging device that receives the visible light passing through the infrared-light removal filter, and
a second imaging device that receives the infrared light passing through the visible-light removal filter.

7. The apparatus according to claim 5, wherein:
the separation section comprises an optical device that transmits one of infrared light and the visible light among the light reflected on the medium, the optical device that reflects the other of the infrared light and the visible light, and
the capturing section comprises:
a first imaging device that receives the visible light passing through the optical device, and
a second imaging device that receives the infrared light passing through the optical device.

8. The apparatus according to claim 5, wherein:
the separation section comprises:
an optical device that transmits one of the infrared light and the visible light among the light reflected on the medium, the optical device that reflects the other the infrared light and the visible light;
a first liquid crystal shutter disposed on an optical path of light passing through the optical device; and
a second liquid crystal shutter disposed an optical path of light reflected by the optical device, the first and second liquid crystal shutters alternatively opened, and
the capturing section comprises a single imaging device that receives the one of the visible light and the infrared light passing through the first liquid crystal shutter and the other of the visible light and the infrared light passing through the second liquid crystal shutter.

9. The apparatus according to claim 1, wherein the exposure system comprises:
an infrared light source that generates infrared light; and
a white light source that generates white light.

10. The apparatus according to claim 1, wherein the exposure system comprises a single light source.

11. An information processing system comprising:
a reading apparatus according to claim 1, the reading apparatus that reads the code from the code image printed on the medium; and
a processing apparatus that performs predetermined processing based on the code read by the reading apparatus.

12. The system according to claim 11, wherein the processing apparatus performs the predetermined processing by activating a predetermined program based on the code read from the code image printed in a particular position on the medium.

13. The apparatus according to claim 1, wherein the light reflected on said medium has an average absorptance in a visible region no greater than 15%, and
wherein the light reflected on said medium has an absorptance in the near-infra-red region of at least 20%.

14. A reading apparatus according to claim 1, wherein the decoding section terminates the reading of a code upon the determination that a medium is counterfeit.

15. A reading apparatus comprising:
a pen configured to write on a medium on which a plurality of code images are printed in a matrix manner with a color material, which is invisible and absorbs infrared light;
an exposure system that applies light to the plurality of code image printed on the medium, the light having an infrared wavelength and a visible wavelength;
a light receiving system that receives infrared light and visible light, which are the light reflected on the medium, to capture the code images with the infrared light and capture the code images with the visible light;
a decoding section that reads position codes indicating positions of the captured code image from the code image captured with the infrared light and reads a code from the code image captured with the visible light;
a calculation section that calculates a locus of the pen based on the position codes read by the decoding section; and
a determination section, wherein when an authentic medium of the medium has a code image printed with an invisible and infrared-light absorbing material and a visible image is overlapped with the code image, if the decoding section can read the position codes indicating the positions of the captured code image by decoding the overlapped visible image captured with the visible light, then the determination section recognizes that the decoding section was able to read and decode the overlapped visible image captured with visible light and determines that the medium is counterfeit.

16. The reading apparatus according to claim 15, wherein the exposure system comprises:
an infrared light source that generates infrared-light; and
a white light source that generates white light.

17. The apparatus according to claim 15, wherein the light reflected on said medium has an average absorptance in a visible region no greater than 15%, and
wherein the light reflected on said medium has an absorptance in the near-infra-red region of at least 20%.

18. A reading apparatus according to claim 15, wherein the decoding section terminates the reading of a code upon the determination that a medium is counterfeit.

19. An antiforgery method comprising:
applying light, which includes invisible and visible wavelengths, to a code image printed on a medium with a color material that is invisible and absorbs infrared light to capture the code image; and
when an authentic medium of the medium has a code image printed with an invisible and infrared-light absorbing material and a visible image is overlapped with the invisible code image, if a code is read and decoded from the overlapped visible image, then determining that the medium is counterfeit.

20. The method according to claim 19, wherein the light reflected on said medium has an average absorptance in the near-infra-red region of at least 20%.

* * * * *